(12) United States Patent
Meyer et al.

(10) Patent No.: US 7,788,984 B2
(45) Date of Patent: Sep. 7, 2010

(54) PLATFORM BALANCE

(75) Inventors: Richard A. Meyer, Chaska, MN (US);
Douglas J. Olson, Plymouth, MN (US);
Ian T. Kunsch, Eden Prairie, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 425 days.

(21) Appl. No.: 11/501,665

(22) Filed: Aug. 8, 2006

(65) Prior Publication Data

US 2007/0039400 A1    Feb. 22, 2007

Related U.S. Application Data

(63) Continuation-in-part of application No. 11/369,211, filed on Mar. 6, 2006, now abandoned, which is a continuation-in-part of application No. 11/003,943, filed on Dec. 3, 2004, now abandoned.

(60) Provisional application No. 60/659,162, filed on Mar. 7, 2005, provisional application No. 60/526,954, filed on Dec. 4, 2003.

(51) Int. Cl.
*G01D 7/00* (2006.01)
(52) U.S. Cl. .................................. 73/862.041
(58) Field of Classification Search ...............
73/862.041–862.046
See application file for complete search history.

(56) References Cited

U.S. PATENT DOCUMENTS 3,377,849 A    4/1968  Lebow .................. 73/134
3,439,541 A    4/1969  Gilder
3,613,443 A    10/1971 Curry
3,618,376 A    11/1971 Shull et al. .................... 73/862
3,693,425 A    9/1972  Starita et al. .................. 73/133

(Continued)

FOREIGN PATENT DOCUMENTS

DE       10013059 A1    9/2001

(Continued)

OTHER PUBLICATIONS

Office Action mailed May 9, 2006 for U.S. Appl. No. 11/003,943.

(Continued)

*Primary Examiner*—Lisa M Caputo
*Assistant Examiner*—Octavia Davis
(74) *Attorney, Agent, or Firm*—Steven M. Koehler; Westman, Champlin & Kelly, P.A.

(57) ABSTRACT

The present disclosure is directed to a platform balance that is suitable for transmitting forces and moments in a plurality of directions. The platform balance is adapted to support a test specimen, such as a large vehicle, in a test environment such as a wind tunnel. The platform balance includes a frame support and at least three spaced-apart transducers coupled to the frame support. Each of the transducers is sensitive about two orthogonal sensed axes. The transducers cooperate to provide signals indicative of forces and moments with respect to at least two orthogonal axes. Each transducer includes a transducer body having a support coupled to a sensor body along an axis of compliance. The sensor body is adapted to deflect about the two orthogonal sensed axes where the sensed axes are mutually orthogonal to the axis of compliance.

37 Claims, 12 Drawing Sheets

U.S. PATENT DOCUMENTS

| | | | | |
|---|---|---|---|---|
| 3,771,359 | A | 11/1973 | Shoberg | 73/141 |
| 3,780,573 | A | 12/1973 | Reus | 73/146 |
| 3,867,838 | A | 2/1975 | Gerresheim | 73/133 |
| 3,939,704 | A | 2/1976 | Zipin | 73/133 |
| 3,956,930 | A | 5/1976 | Shoberg | 73/862.045 |
| 4,023,404 | A | 5/1977 | Brendel | 73/133 R |
| 4,066,140 | A | 1/1978 | Conley | 177/134 |
| 4,107,986 | A | 8/1978 | Jones | 73/147 |
| 4,143,727 | A * | 3/1979 | Jacobson | 177/211 |
| 4,161,874 | A * | 7/1979 | Specker et al. | 73/12.01 |
| 4,171,641 | A | 10/1979 | Landsness | 73/146 |
| 4,259,863 | A * | 4/1981 | Rieck et al. | 73/862.041 |
| 4,297,877 | A | 11/1981 | Stahl | 73/146 |
| 4,448,083 | A | 5/1984 | Hayashi | 73/862 |
| 4,488,441 | A | 12/1984 | Ramming | 73/862 |
| 4,493,220 | A | 1/1985 | Carignan et al. | 73/862 |
| 4,499,759 | A | 2/1985 | Hull | 73/146 |
| 4,550,617 | A | 11/1985 | Fraignier et al. | 73/862 |
| 4,573,362 | A | 3/1986 | Amlani | 73/862 |
| 4,616,511 | A | 10/1986 | Gindy et al. | 73/862.045 |
| 4,640,138 | A | 2/1987 | Meyer et al. | 73/862 |
| 4,672,855 | A | 6/1987 | Schmieder | 73/862 |
| 4,706,506 | A | 11/1987 | Lestelle | 73/862.044 |
| 4,748,844 | A | 6/1988 | Yoshikawa et al. | 73/146 |
| 4,763,531 | A | 8/1988 | Dietrich et al. | 73/862 |
| 4,811,608 | A * | 3/1989 | Hilton | 73/862.043 |
| 4,821,582 | A | 4/1989 | Meyer et al. | 73/862 |
| 4,823,618 | A | 4/1989 | Ramming | 73/862 |
| 5,313,828 | A | 5/1994 | Kotzle et al. | 73/146 |
| 5,315,882 | A | 5/1994 | Meyer et al. | 73/862 |
| 5,335,557 | A | 8/1994 | Yasutake | 73/862.043 |
| 5,400,661 | A | 3/1995 | Cook et al. | 73/862 |
| 5,540,108 | A | 7/1996 | Cook et al. | 73/862 |
| 5,591,924 | A | 1/1997 | Hilton | 73/862.043 |
| 5,894,094 | A | 4/1999 | Kuchler et al. | 73/862 |
| 5,969,268 | A | 10/1999 | Sommerfeld et al. | 73/862 |
| 6,038,933 | A | 3/2000 | Meyer | |
| 6,109,115 | A | 8/2000 | Miyazaki | 73/794 |
| 6,532,830 | B1 | 3/2003 | Jansen et al. | 73/862.042 |
| 6,536,292 | B1 | 3/2003 | Clark et al. | 73/862.043 |
| 6,699,235 | B2 * | 3/2004 | Wallace et al. | 606/1 |
| 6,769,312 | B2 * | 8/2004 | Meyer et al. | 73/862.042 |
| 6,845,675 | B2 * | 1/2005 | Meyer et al. | 73/862.041 |
| 2002/0092348 | A1 | 7/2002 | Ulman et al. | 73/147 |
| 2005/0120808 | A1 | 6/2005 | Meyer et al. | |

FOREIGN PATENT DOCUMENTS

| | | |
|---|---|---|
| FR | 2490342 | 3/1982 |
| GB | 2087085 | 5/1982 |

OTHER PUBLICATIONS

Office Action mailed Mar. 6, 2006 for U.S. Appl. No. 11/369,211.

Written Opinion of the International Searching Authority of the Eurropean Patent Office in counterpart foreign application No. PCT/US2007/017223, filed Aug. 2, 2007.

Submitted herewith is an Official Search Report of the European Patent Office in counterpart foreign application No. PCT/US2007/017223, filed Aug. 2, 2007.

Official Search Report of the European Patent Office in counterpart foreign application No. PCT/US04/40450 filed Dec. 3, 2004.

Official Search Report of the European Patent Office in counterpart foreign application No. PCT/US06/008142 filed Mar. 7, 2006.

Official Written Opinion of the European Patent Office in counterpart foreign application No. PCT/US04/40450 filed Dec. 3, 2004.

Official Written Opinion of the European Patent Office in counterpart foreign application No. PCT/US06/008142 filed Mar. 7, 2006.

U.S. Appl. No. 11/003,943, filed Dec. 3, 2004.

U.S. Appl. No. 11/369,211, filed Mar. 6, 2006.

Milton J. Lebow, "Summer Instrument-Automation Conference and Exhibit—Toronto, Ontario, Canada", Instrument Society of America Conference Preprint, Jun. 5-8, 1961.

G. Hirzinger, "Direct Digital Robot Control Using A Force-Torque-Sensor", IFAC Symposium on Real Time Digital Control Applications, Guadalajara, Mexico, Jan. 15-21, 1983.

Wurll, "Tactile Force-Torque Sensor for Performing Control Tasks in Robotics", XP002210941, vol. 15, No. 3, pp. 120-125, 1986.

Assorted Astek Engineering, Inc. brochures, 1983.

A. Rupp, W. Diefenbach, V. Grubisic, "Erfassung der mehraxialen Fahrbetriebsbelastungen mit dem MeBrad 'VELOS'", ATZ Automobiltechnische Zeitschrift 96, 1994, pp. 764-768.

A. Rupp, V. Grubisic, "Reliable and Efficient Measurement of Suspension Loads on Passenger Cars and Commercial Vehicles", reprint from "Advanced Measurement Techniques and Sensory Systems for Automotive Applications: Accuracy and Reliability", Proceeding of the 1st International Conference and Exhibition, Ancona 29-30.6. 1995, Hrsg. ATA Orbassano (1995), S. 263-273.

Brochure: Wheel force transducer—the key for real world simulation, Schenck ATC, Apr. 1995.

"Flexible Wheel Force Transducer System for Road Load Data Acquisition", IGEB, Apr. 1995.

TML pam E-670 A: "TML 6-Component Wheel Force Measuring Equipment SLW-A/MFT-106", Texas Measurements, Inc.

"Unique Solutions to Measurement Problems", Robert A. Denton, Inc.

JSAE Review, Official Journal of the Society of Automotive Engineers of Japan, Inc., vol. 16, 1995, pp. 83-89.

"MMS-6800", Nissho Electric Works, Col. Ltd.

T. Liang et al., "Transducer for Surface Force Measurement", Agricultural Engineering, vol. 46, No. 1112, Dec. 1965, St. Joseph, US, pp. 688-691.

Broucher: "Kistler Vehicle Engineering News", May 1997.

Walter Weiblen, Thomas Hofmann, "Evalution of Different Designs of Wheel Force Transducers", SAE Technical Paper Series, International Congress and Exposition, Feb. 23-26, 1998, pp. 1-10.

Cantilever Mounted Bi-Axial Force Transducer with Near Parallel Translation, IBM Technical Disclosure Bulletin, vol. 33, No. 11, Apr. 1, 1991, pp. 481-483.

* cited by examiner

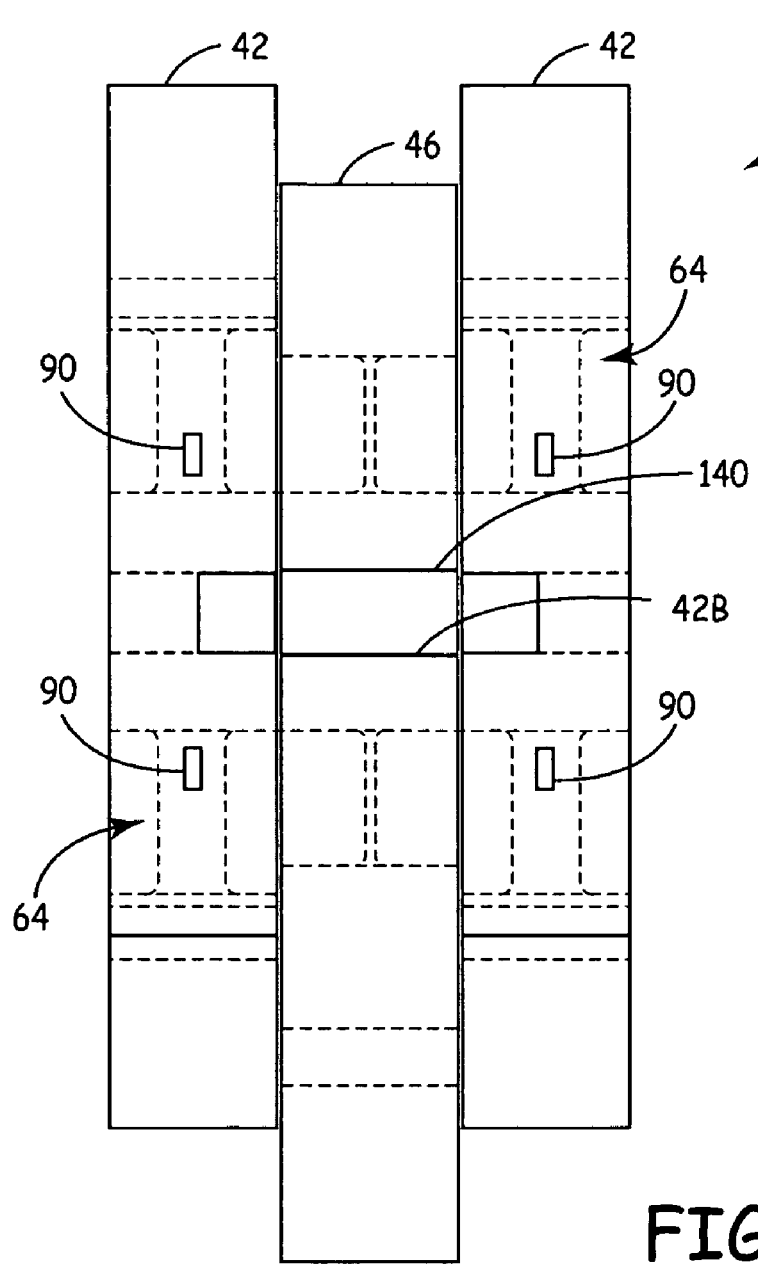
FIG. 8
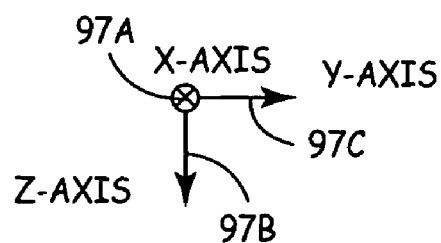

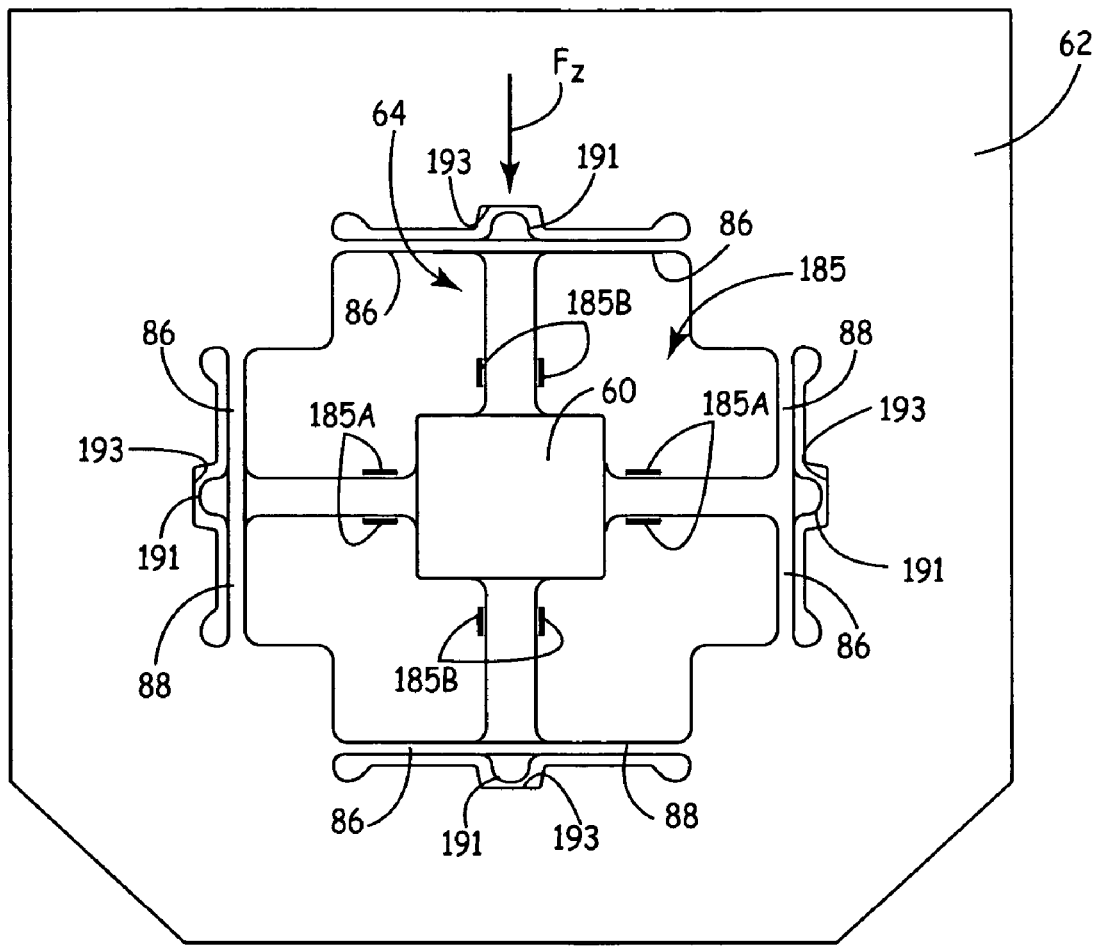
FIG. 15
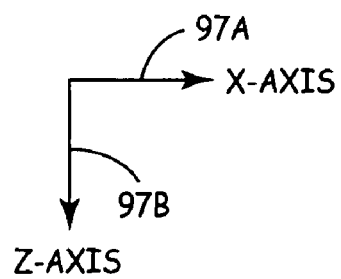

PLATFORM BALANCE

REFERENCE TO CO-PENDING APPLICATION

This patent application is a continuation-in-part and claims priority to United States patent application entitled "Platform Balance", filed on Mar. 6, 2006 and assigned Ser. No. 11/369, 211, which claims the benefit of United States provisional patent application entitled "Platform Balance," filed Mar. 7, 2005 and assigned Ser. No. 60/659,162, and where application Ser. No. 11/369,211 also is a continuation-in-part and claims priority to United States patent application entitled "Platform Balance", filed on Dec. 3, 2004 and assigned Ser. No. 11/003,943, and where application Ser. No. 11/003,943 claims the benefit of United States provisional patent application entitled "Platform Balance", filed on Dec. 4, 2003, and assigned Ser. No. 60/526,954. Each of the foregoing applications is incorporated herein by reference in their entirety.

BACKGROUND

The discussion below is merely provided for general background information and is not intended to be used as an aid in determining the scope of the claimed subject matter.

The present disclosure relates to devices that transmit and measure linear forces along and moments about three orthogonal axes. More particularly, the present disclosure relates to devices that are particularly well suited to measure forces and moments upon a test specimen in a test environment, such as in a wind tunnel.

The measurement of loads, both forces and moments, with accuracy and precision is important to many applications. A common use, where several moments and forces need to be measured, is in the testing of specimens in a wind tunnel. Test specimens can be placed on a platform balance located in a pit of the wind tunnel. The platform balance can be adapted to receive a vehicle or other large test specimen, rather than merely a scale model of the vehicle. Actual vehicles, rather than scale models of the vehicles, allows the designer to determine actual measurements of prototypes, rather than merely inferential measurements. If the test specimen is a vehicle with wheels, the platform balance can be equipped with a rolling belt to rotate the wheels, which can make a significant improvement in measurement accuracy.

Six components of force and moment act on a test specimen on the platform balance in the wind tunnel. These six components are known as lift force, drag force, side force, pitching moment, yawing moment, and rolling moment. The moments and forces that act on the test specimen are usually resolved into three components of force and three components of moment with transducers that are sensitive to the components. Each of the transducers carries sensors, such as strain gages, that are connected in combinations that form Wheatstone bridge circuits. By appropriately connecting the sensors, resulting Wheatstone bridge circuit unbalances can be resolved into readings of the three components of force and three components of moment.

Platform balances have a tendency to be susceptible to various physical properties of the test environment that can lead to inaccurate measurements without additional compensation. For example, temperature transients in the wind tunnel can result in thermal expansion of the platform balance that can adversely affect the transducers. In addition, large test specimens are prone to create large thrust loads on the transducers that can cause inaccurate measurements. Accordingly, there is a continuing need to develop a platform balance suitable for use with large test specimens.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

The present disclosure is directed to a platform balance that is suitable for transmitting forces and moments in a plurality of directions. The platform balance is adapted to support a test specimen, such as a large vehicle, in a test environment such as a wind tunnel. The platform balance includes a frame support and at least three spaced-apart transducers coupled to the frame support. Each of the transducers is sensitive about two orthogonal sensed axes. The transducers cooperate to provide signals indicative of forces and moments with respect to at least two orthogonal axes. In one example, the frame support includes a first perimeter frame and a second perimeter frame. The platform balance of this example includes four spaced-apart transducers coupling the first perimeter frame to the second perimeter frame. Transducers sensitive about two orthogonal sensed axes do not suffer from the effects of thermal expansion of the frame support and reject the large thrust loads present in transducers sensitive about three orthogonal sensed axes.

The present disclosure is also directed to a transducer body having a support coupled to a sensor body along an axis of compliance. The sensor body is adapted to deflect about the two orthogonal sensed axes where the sensed axes are mutually orthogonal to the axis of compliance. In one aspect, the support includes a pair of clevis halves disposed on opposite sides of the sensor body along the axis of compliance.

BRIEF DESCRIPTION OF THE FIGURES

FIG. 8 is a side view of another transducer constructed in accordance with the present disclosure.

FIG. 15 is a front elevational view of an inner member.

DETAILED DESCRIPTION OF THE ILLUSTRATIVE EMBODIMENTS

This disclosure relates to devices and structures that transmit and measure linear forces along and moments about three orthogonal axes. The disclosure, including the figures, describes a platform balance and included transducers with reference to a several illustrative examples. For example, the disclosure proceeds with respect to frame supports attached to multi-part transducer assemblies described below. However, it should be noted that the present invention could be implemented in other devices or structures and transducers, as well. The present invention is described with respect to the frame supports and transducer assembly for illustrative purposes only. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1:
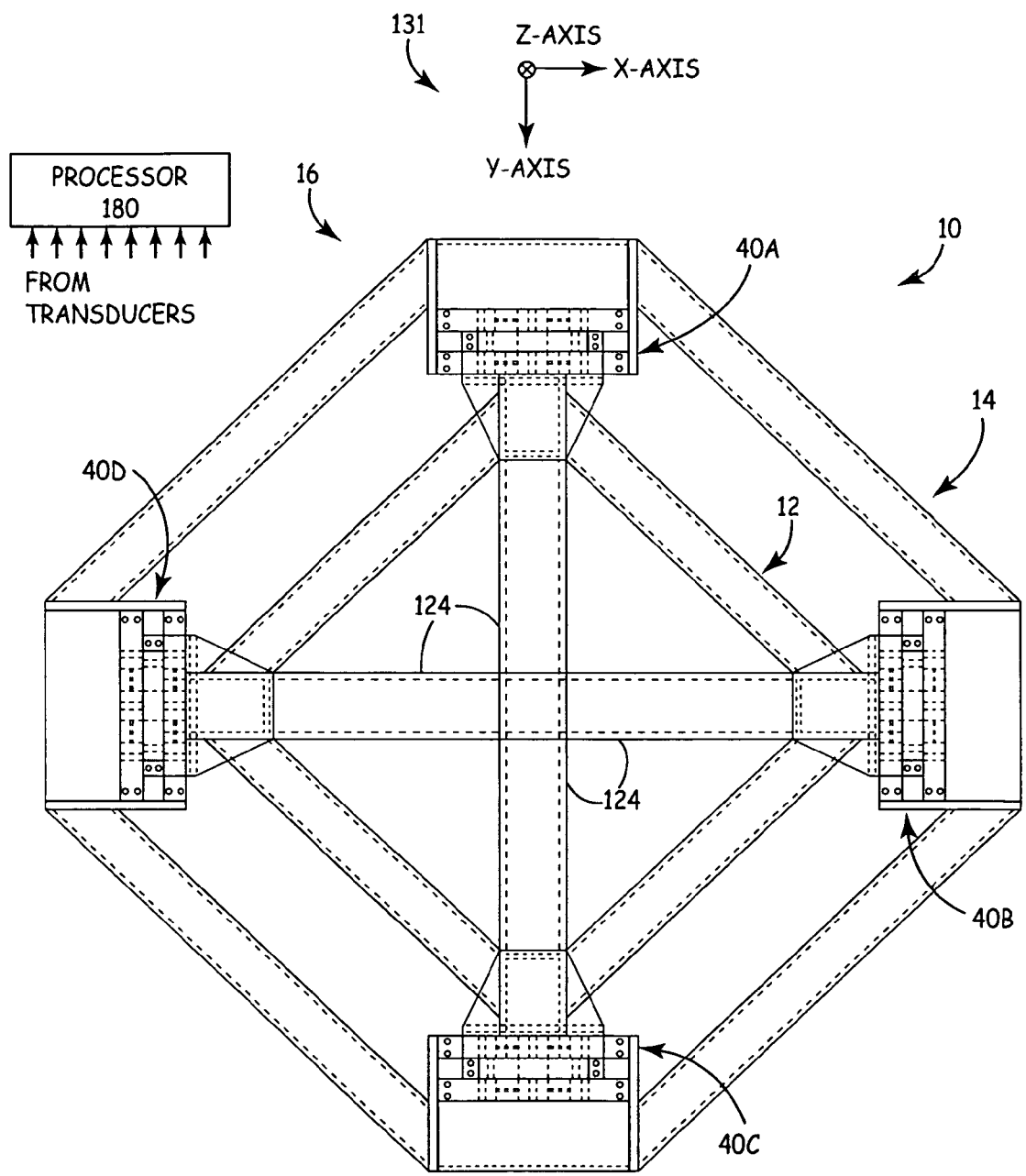
FIG. 1 is a plan view of a platform balance constructed in accordance with the present disclosure.
Figure 2:
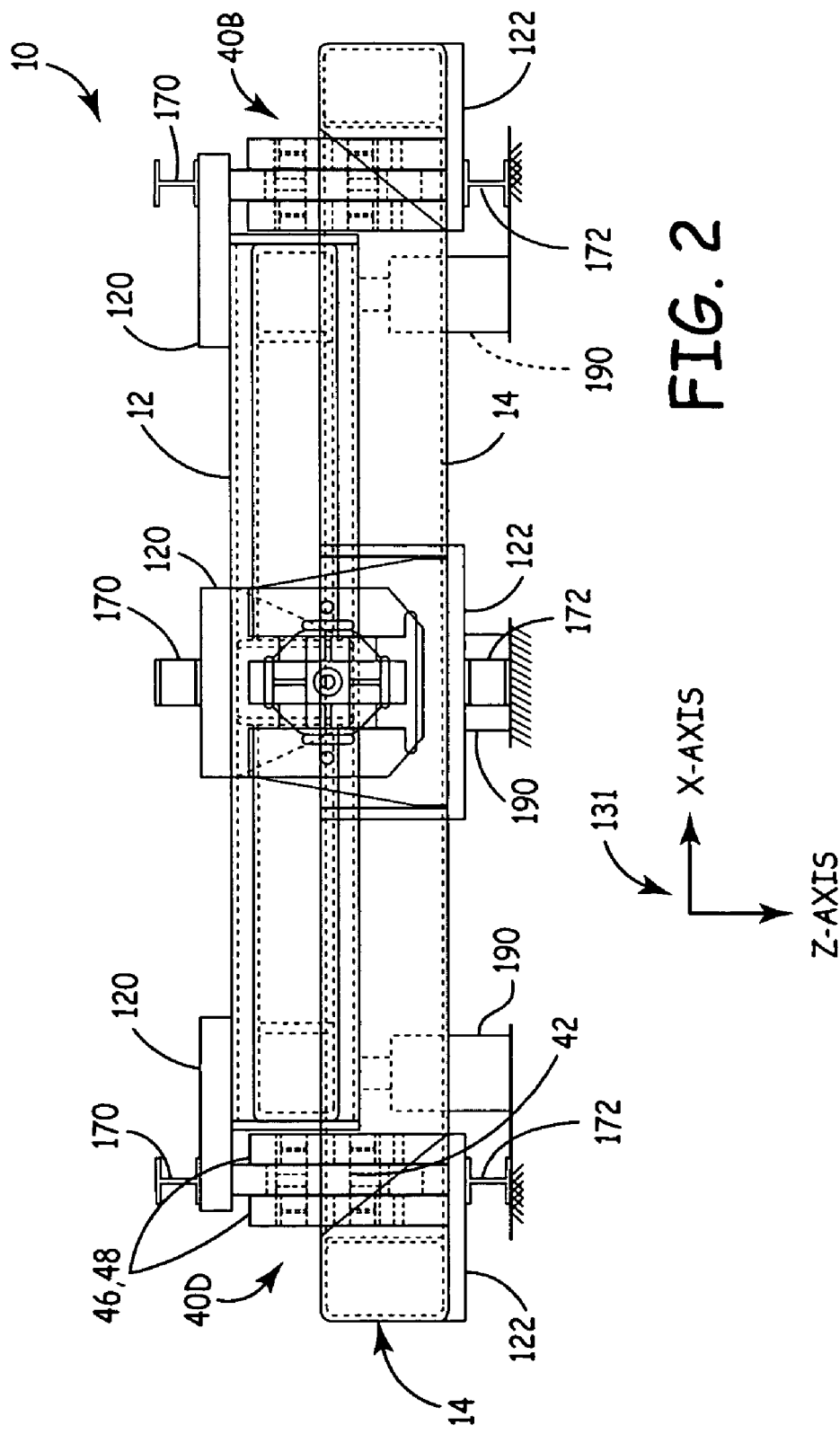
FIG. 2 is an elevation view of the platform balance of FIG. 1 having additional features and is suitable for receiving a test specimen.
Figure 3:
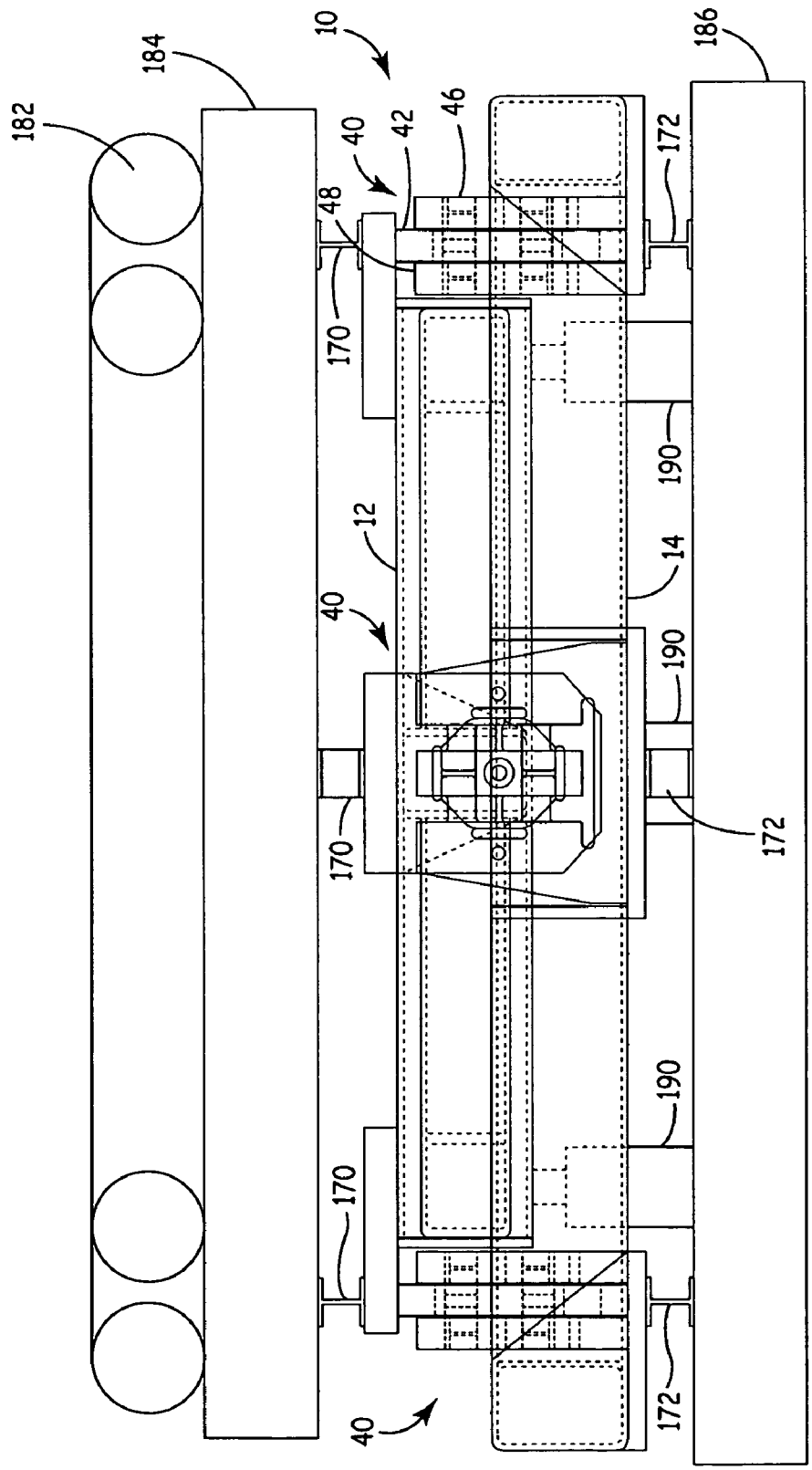
FIG. 3 is an elevation view of the platform balance of FIG. 2, and having an exemplary test specimen.

An exemplary embodiment of a platform balance 10 of the present disclosure is illustrated in FIGS. 1-3. In the embodiment illustrated, the platform balance 10 can include a first frame support 12 and a second frame support 14. A plurality of transducer assemblies 16, herein four although any number three or more can be used, couple the first frame support 12 to the second frame support 14. The platform balance 10 can be used to measure forces and moments applied to a test specimen of nominally large weight or mass such as a vehicle, engine, plane, etc. The frame supports 12 and 14 are nominally unstressed reaction frames, wherein each of the transducers comprises a two-axis force transducer. Various levels of flexure isolation can be provided in the platform balance 10 to provide increased sensitivity, while nominally supporting large masses.

Figure 4:
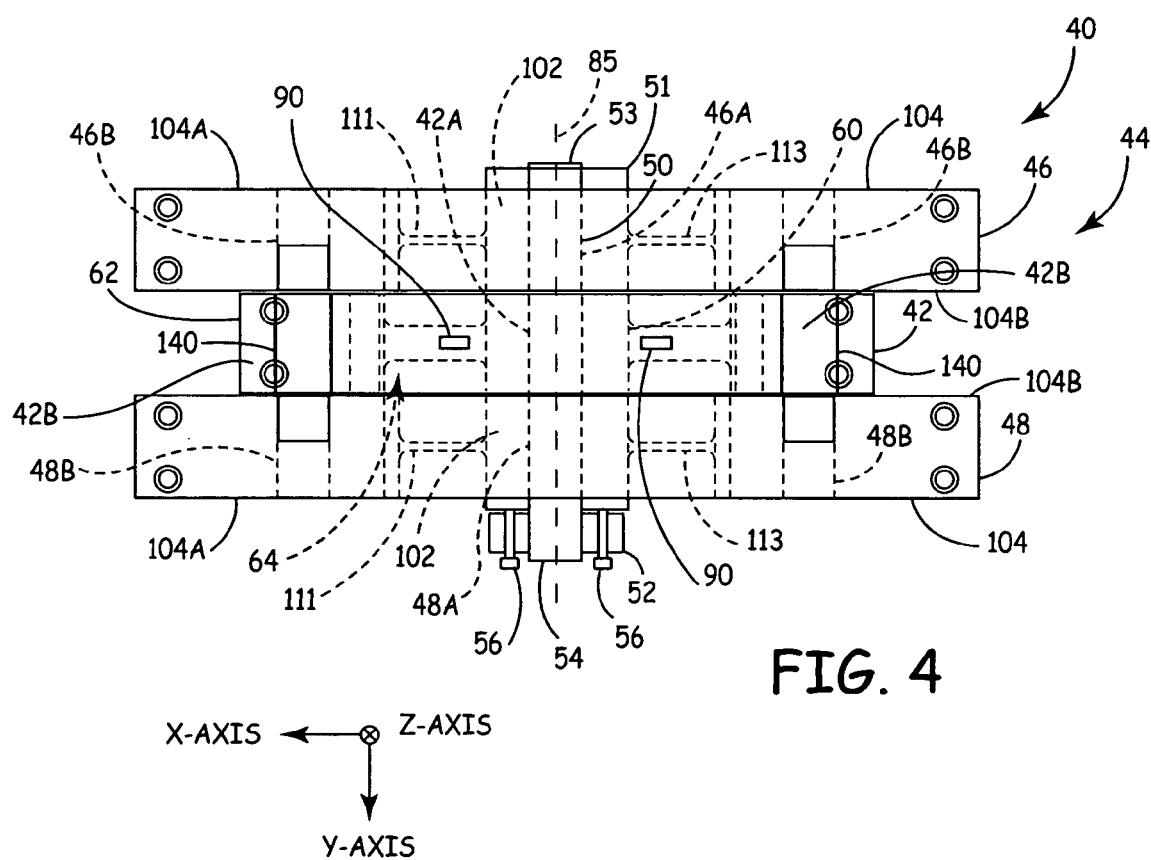
FIG. 4 is a top view of a transducer constructed in accordance with the present disclosure and included in the platform balance of FIG. 1.
Figure 5:
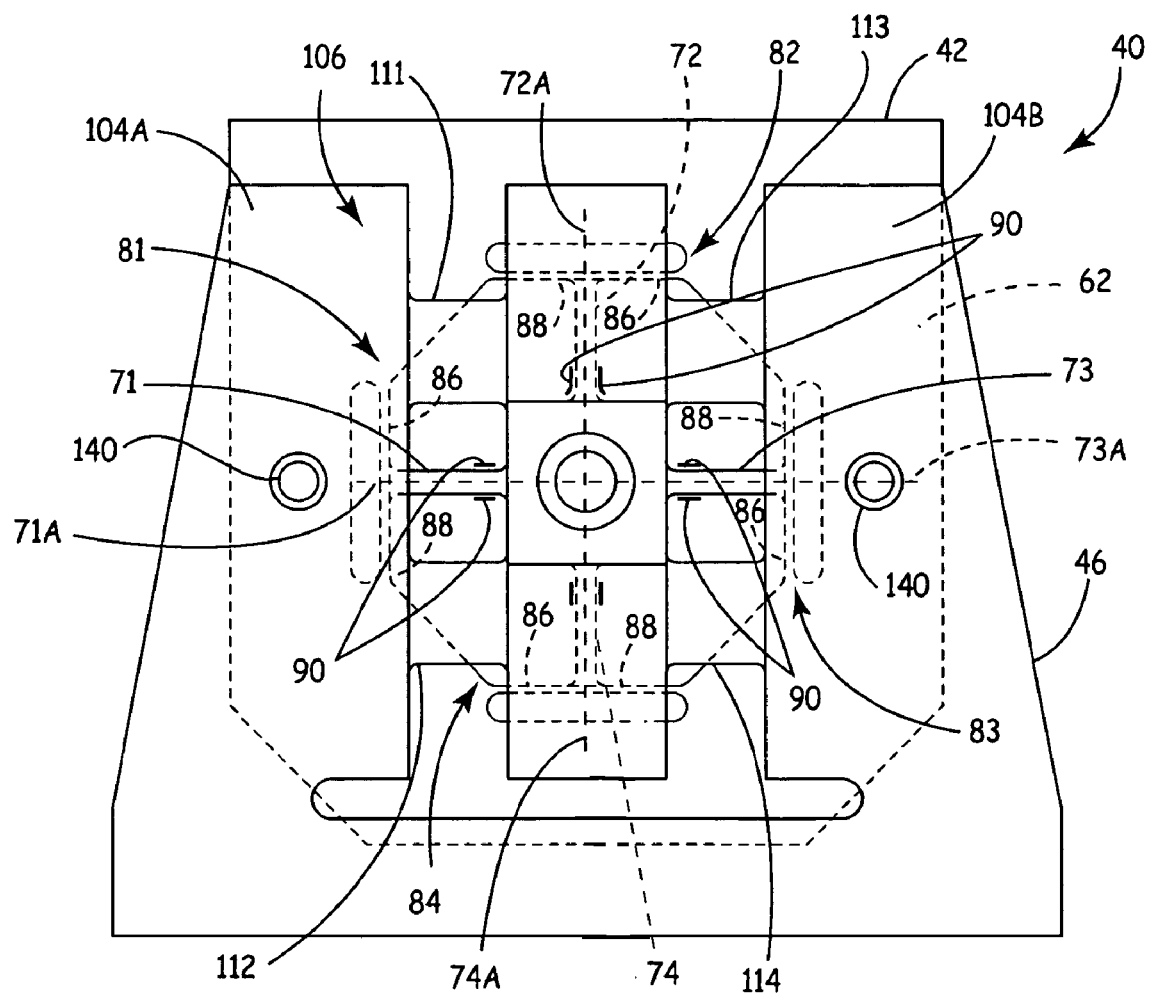
FIG. 5 is a front view of the transducer of FIG. 4.
Figure 5:
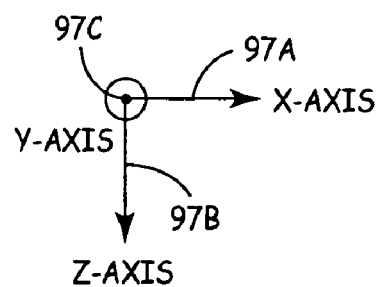
Figure 6:
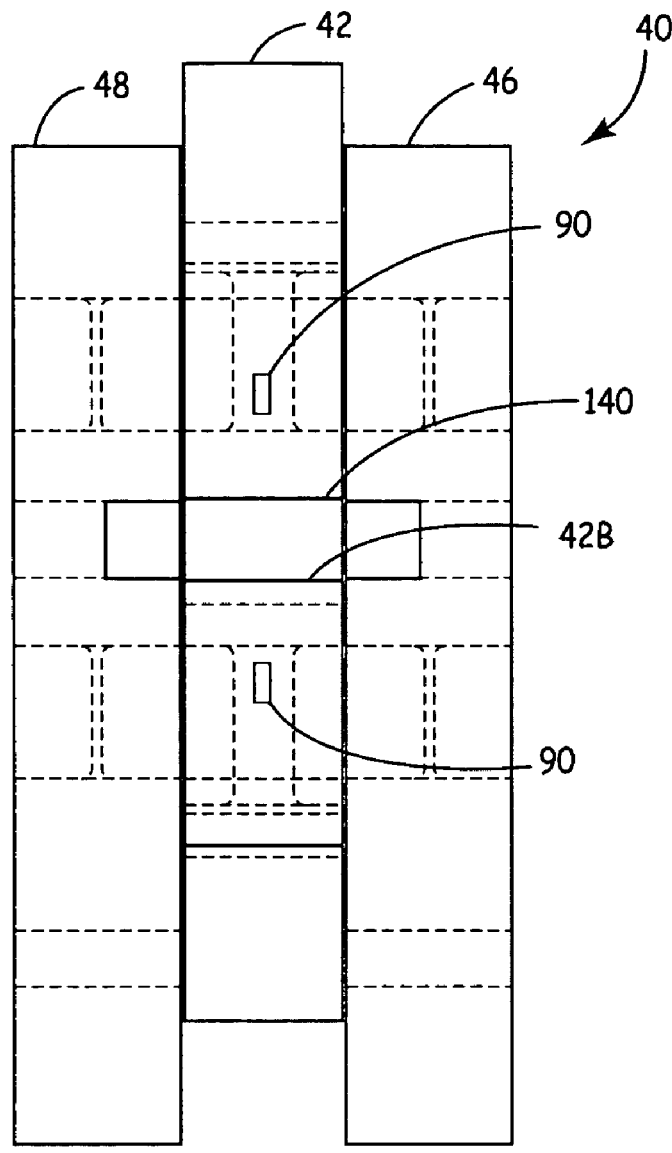
FIG. 6 is a side view of the transducer of FIG. 4.

Referring to FIGS. 4-6, one of the transducer assemblies is illustrated at 40, wherein each of the transducer assemblies 16 is preferably similarly constructed. The transducer assembly 40 includes a sensor body 42 and a clevis assembly 44. The clevis assembly 44 includes a first clevis half 46 and a second clevis half 48. The sensor body 42 is disposed between the clevis halves 46 and 48 and joined together with a suitable fastener. In the embodiment illustrated, the fastener comprises a bolt or threaded rod 50 extending through apertures 48A, 42A and 46A of the clevis half 48, sensor body 42 and clevis half 46, respectively. A nut 51 is provided on an end 53 of rod 50 and a super nut 52 is threaded upon an end 54 of the threaded rod 50. A plurality of set screws 56 extends through the apertures in the nut 52 to engage an end of the clevis half 46. Tightening of the set screws 56 allows high clamping pressures to be achieved efficiently and at reduced torque values on each of the set screws 56 rather than through the use of a nut 52 by itself. It should be noted that although center portions of the devises 46 and 48 will engage or contact the center portion of the sensor body 42 about the apertures 46A, 42A and 48A, gaps are otherwise provided between each of the clevis halves 46 and 48 and the sensor body 42 so as to allow the sensor body 42 to move relative to the clevis halves 46 and 48.

The sensor body 42 is preferably integral, being formed of a single unitary block of material. The sensor body 42 includes a ridged central hub 60, herein including the aperture 42A, and a ridged perimeter body 62 that is concentric with, or disposed about, the central hub 60. A plurality of flexure structures 64 (herein flexure beams 64 although other forms could be used) join the central hub 60 to the perimeter body 62. In the embodiment illustrated, the plurality of flexure beams 64 comprises four straps 71, 72, 73 and 74. Each of the straps 71-74 extend radially from the central hub 60 to the perimeter body 62 along corresponding longitudinal axes 71A, 72A, 73A and 74A. Preferably, axis 71A is aligned on axis 73A, while axis 72A is aligned with axis 74A. In addition, axes 71A and 73A are perpendicular to axes 72A and 74A. Although illustrated wherein the plurality of flexure beams 64 equals four, it should be understood that any number of straps three or more can be used to join the central hub 60 to the perimeter body 62. Preferably, the flexure beams 64 are spaced at equal angular intervals about a central axis indicated at 85.

Flexure members 81, 82, 83 and 84 join an end of each flexure beam 71-74, respectively, to the perimeter body 62. The flexure members 81-84 are compliant with displacements of each corresponding flexure beam 71-74 along the corresponding longitudinal axes 71A-74A. In the embodiment illustrated, the flexure members 81-84 are identical and include integrally formed flexure straps 86 and 88. The flexure straps 86 and 88 are located on opposite sides of each longitudinal axes 71A-74A and joined to corresponding flexure beam 71-74 and to the perimeter body 62.

A sensing device measures displacement or deformation of portions of the sensor body 42. In the body illustrated, a plurality of strain sensors 90 are mounted on the flexure beams 64 to sense strain therein. Although the plurality of sensors 90 can be located on the plurality of flexure beams 64 to provide an indicated of shear stresses, in the embodiment illustrated, the strain sensors are mounted conventionally to provide an output signal indicative of bending stresses in the flexure beams 64. In the embodiment illustrated, eight strain sensors are provided on the sensor body 42 of each transducer 40 wherein two conventional Wheatstone bridges are formed. A first Wheatstone bridge or sensing circuit is conventionally formed from the strain sensors provided on flexure beam 71 and 73, while a second Wheatstone bridge or second sensing circuit is formed from the strain sensors provided on flexure beams 72 and 74. In another embodiment, separate Wheatstone bridges can be formed on each flexure beam 71-74, the outputs of which can be combined as is known in the art. The plurality of sensors 90 can comprise resistive strain gauges. However, other forms of sensing devices such as optically based sensors or capacitivity based sensors can also be used to measure deformation or displacement of the flexure beams 64, or other portions of the sensor body 42 such as each of straps 86 and 88 if desired.

Output signals from the sensing devices are indicative of force components transmitted between the central hub 60 and the perimeter body 62 in two degrees of freedom. For purposes of explanation, a coordinate system 97 can be defined wherein an X-axis 97A is aligned with the longitudinal axes 71A and 73A; a Z-axis 97B is aligned with the vertical axes 72A and 74A and a Y-axis 97C is aligned with the axis 85.

In the embodiment illustrated, each of the transducer assemblies 16 measures two forces. Specifically, a force along the X-axis is measured as bending stresses created in the flexure beams 72 and 74 since the flexure members 81 and 83 on the ends of the flexure beams 71 and 73 are compliant in this direction. Similarly, a force along the Z axis is measured as bending stresses in the flexure beams 71 and 73 since the flexure members 82 and 84 on the ends of the flexure beams 72 and 74 are compliant in this direction.

The transducer 40 is also compliant along the axis 85, because of flexures provided on the clevis assembly 44. In the embodiment illustrated, the clevis assembly 44 is formed of substantially identical clevis halves 46 and 48. In the illustrated embodiment, the sensor 42 is the "inner member" of the transducer body. Other embodiments are contemplated. For example, a single clevis half by itself could also be used. Still further, a single clevis half as an inner member connected to two sensors, which is described later with respect to FIG. 8 could also be used.

In the embodiment illustrated, each clevis half 46 and 48 includes a central hub 102 through which, in the embodiment illustrated, apertures 46A and 48A are provided, and a rigid outer body 104. A flexure mechanism couples the rigid central hub 102 with the outer body 104. In the embodiment illustrated, a plurality of flexure straps 106 are provided with a first pair of flexure straps 111 and 112 extending from the central hub 102 to a first portion 104A of the outer body 104 and a second pair of flexure straps 113 and 114 extending from the central hub 102 to a second portion 104B of body 104. However, it should be noted that other forms of flexure members or mechanism can be used between the rigid hub 102 and the outer body 104 to allow compliance along axis 85 if desired. Such forms can include other integral flexure mechanisms such as a diaphragm(s), or multi-component assemblies having flexible couplings such as slides or pivot connections.

Referring FIGS. 1-3, the sensor body 42 of each of the transducer assemblies 40 is joined to the frame support 12, while each of the clevis halves 46 and 48 of each transducer assembly 40 is joined to a frame support 14. In the embodiment illustrated, mounting plates 120 are used to couple the sensor bodies 42 to the frame support 12, while mounting plates 122 are used to join the clevis halves 46 and 48 to the frame support 14. In this manner, the frame support 12 provides an inner perimeter frame, while the frame support 14 provides an outer perimeter frame. Use of the mounting plates 120 and 122 allows the frame supports 12 and 14 to be nested thereby reducing an overall height of the platform balance 10.

Each of the frame supports 12 and 14 comprise continuous hollow box beams formed in a perimeter so as to provide corresponding stiff assemblies. The frame support 12 holds the sensor bodies 42 in position with respect to each other, while the frame support 14 holds the clevis assemblies 44 in position with respect to each other. Stiffening box frame members 124 can also be provided in the support frame 12 as illustrated.

As appreciated by those skilled in the art, outputs from each of the two-axis sensing circuits from each of the transducer assemblies 16 can be combined so as to sense or provide outputs indicative of forces and moments upon the platform balance in six degrees of freedom. It should be noted that the flexure mechanisms of the clevis assembly 44 causes the transducers 16 to operate in a manner similar to how the flexure members 81-84 provide compliance in the sensor body 42.

A coordinate system for platform 10 is illustrated at 131 in FIGS. 1 and 2. Output signals from transducer assemblies 40A and 40C are used to measure forces along the X-axis, because transducer assemblies 40B and 40D are compliant in this direction. Likewise, output signals from transducer assemblies 40B and 40D are used to measure forces along the Y-axis, because transducer assemblies 40A and 40C are compliant in this direction. Outputs from all of the transducers 40A-40D are used to measure forces along the Z-axis. Overturning moments about the X-axis are measured from the output signals from transducers 40A and 40C; while overturning moments about the Y-axis are measured from the output signals from transducers 40B and 40D; and while overturning moments about the Z-axis are measured from the output signals from transducers 40A-40D. Processor 180 receives the output signals from the sensing circuits of the transducers 40 to calculate forces and/or moments as desired, typically with respect to the orthogonal coordinate system 131.

As described above, the platform can comprise four two-axis transducer assemblies. This particular design can have advantages over an embodiment having four three-axis (or more) transducer assemblies. In addition to the rejection of thermal expansion of the frames 12 and 14 relative to each other during lab or tunnel temperature transients, the platform 10 does not have to reject a relatively large thrust load on each of the four transducer assemblies (the clevis flexures are all very soft in thrust (along axis 86) thus shedding load to the two orthogonal two-axis transducer assemblies when an x or y side load is applied). This allows the platform 10 to be more optimally tuned for the four sensing flexure straps in each two-axis sensor body 42 than if the assembly was trying to react and measure thrust at the four transducer assembly positions about the platform as in three or more than three axis transducer assemblies. The design allows cross axis dimensions and I/c of orthogonal flexure beams to be changed independently to optimize sensitivity. For example, two can be thicker than the other two and can be thickness variable as well. If the transducer assemblies were three axis transducers and this occurred, two of the beams in line with each other would be stiffer and give different outputs from the orthogonal pair and thus make the sensor behave strangely with off axis or combined loadings. Lack of need to measure and react to thrust also allows higher stress and strain designs since there is no second bending stress tensor which would add bending in an additional axis at beam root connections to inner central hubs. Again higher sensitivity, higher resolution and higher signal to noise ratio with greater span on scalability both absolute and measured components relative to each other are provided.

In a further embodiment, over travel stop mechanisms are provided in each of the transducer assemblies 16 so as to prevent damage to the sensor bodies 42 or flexure mechanisms of the clevis assemblies 44. Referring back to FIGS. 4-6, one or more pins 140 are provided so as to limit displacement of the sensor body 42 relative to the clevis assembly 44. In the embodiment illustrated, apertures 46B, 48B, 42B are provided in the clevis halves 46 and 48 and the sensor body 42, respectively. The pin 140 is secured, for example, to the sensor body 42 such as by a press fit so that extending portions of the pin 140 extend into the apertures 46B and 48B of the clevis halves 46 and 48 and are nominally spaced apart from inner walls thereof. If displacement of the displaceable portions of the sensor bodies 42 exceeds that desired relative to the bodies of the clevis halves 46 and 48, extending portions of the pin 140 will contact the inner wall of the apertures 46B and/or 48B provided in the clevis half 46 and/or 48 thereby coupling the perimeter body 62 of the sensor body 42 with the outer bodies 104 of the clevis halves 46 and 48 to prevent damage to the flexure straps or mechanism. Note that the perimeter body 62 can be appropriately spaced from the clevis half (halves) 46 and/or 48 to provide overtravel protection. In particular, the perimeter body 62 can engage the clevis halves 46 and/or 48, if displacement along axis 85 exceeds a selected distance.

Figure 7:
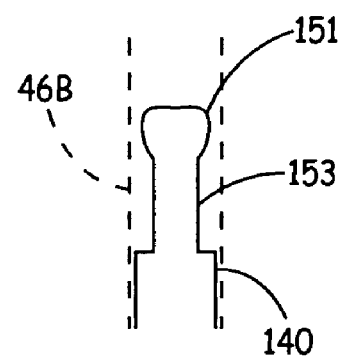
FIG. 7 is a detailed view of a portion of the transducer of FIG. 4.

Although the sensor body 42 and clevis halves 46 and 48 can be formed from any suitable material, in one embodiment, the sensor body 42 is formed from steel, while the clevis halves are formed from aluminum. Each of the pins 140 can be formed from hardened steel and if necessary, hardened bushings can be provided in the apertures 46B, 48B of the clevis halves 46 and 48 to engage the remote portions of the pin 140. It should be noted that the extending portions of the pin 140 can be provided with a curved or spherical surface 151, as illustrated in FIG. 7, relative to a shank portion 153 so as ensure distributed contact of the pin 140 with the inner wall of the apertures 46B, 48B formed in the clevis halves 46 and 48.

It should also be noted that depending on the intended application the sensor body 42 and clevis half or halves can be formed a single unitary body.

FIG. 8 shows an alternative embodiment of the transducer, i.e., transducer 40' and corresponding body. Like parts are indicated with like reference numerals. In this embodiment, one of the clevis halves 46 of FIG. 4-6 becomes the inner member. Two sensor members 42 from FIGS. 4-6 become the clevis halves. In this example and unlike the previous examples, the inner member is not instrumented. Rather, the sensor member structures of the previous embodiment are instrumented with sensors, but in this embodiment function as clevis halves. Suitable sensors such as strain gauges 90 are still connected to the members 42. The illustrated example includes twice as many sensors 90 as in the embodiment of FIGS. 4-6. In order to provide usable outputs, the sensor signals can be combined in each transducer such as by combining or summing the signals in Wheatstone bridges as is known in the art. The configuration of FIG. 8 is stiffer in the y-direction (as indicated in the coordinate system) than the embodiment of FIGS. 4-6. The embodiment of FIGS. 4-6, however, is stiffer in a moment about the x-axis than the embodiment of FIG. 8.

Figure 9:
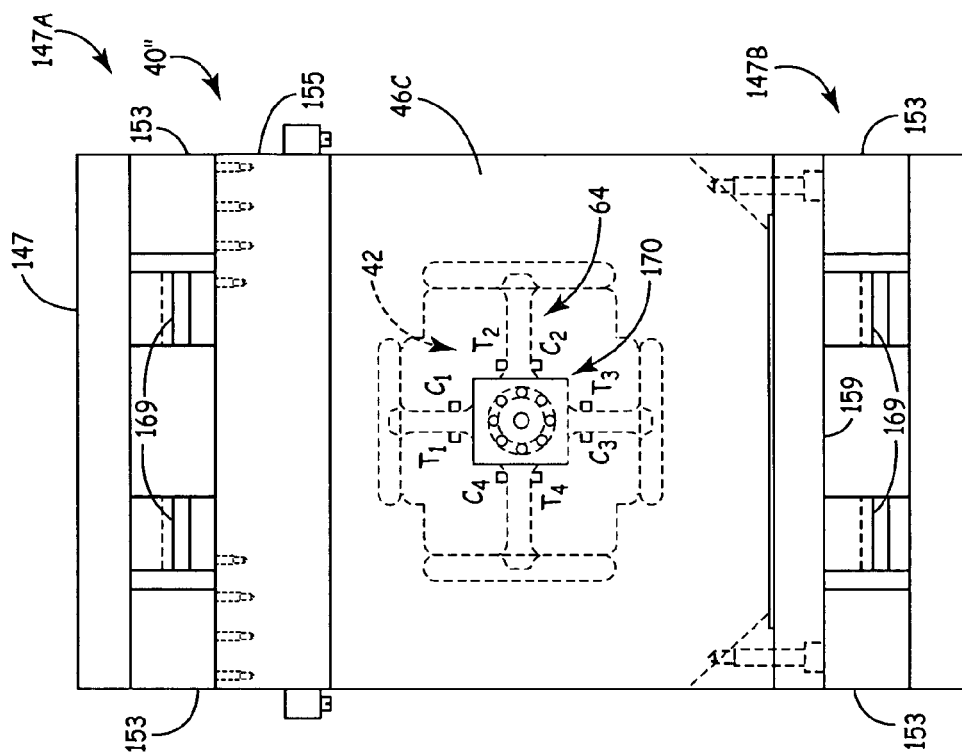
FIG. 9 is a front view of another transducer constructed in accordance with the present disclosure.
Figure 10:
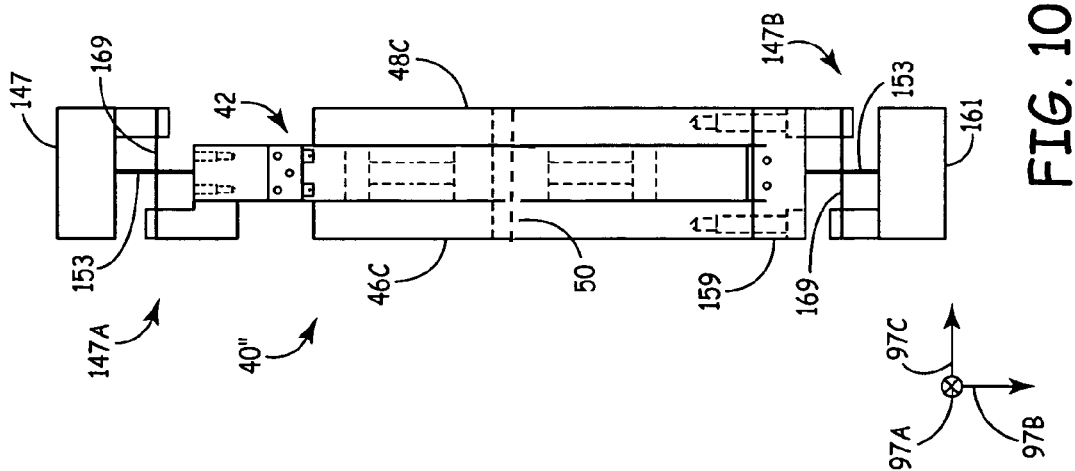
FIG. 10 is a side view of the transducer of FIG. 9.

FIGS. 9 and 10 illustrate yet another embodiment of a transducer, i.e., transducer 40" and corresponding body. Like parts are indicated with like reference numerals. Transducer 40" is similar to transducer 40 described above in that sensor body 42 is disposed between clevis halves 46C and 48C; however in this embodiment clevis halves 46C and 48C are solid, rigid supports without flexure members therein. As with the embodiments described above, transducer 40" is a two-axis sensing assembly for sensing forces along the X-axis 97A and Z-axis 97B when suitable sensors devices are provided for sensor body 42, while being insensitive or compliant for forces along the Y-axis 97C. In particular, flexure assemblies 147A and 147B, herein embodied as relatively thin flexible plates, allow the sensor body 42 and clevis halves 46C, 48C to move freely along the Y-axis 97C, being compliant in that direction, but substantially stiff to transfer force loads along the X-axis 97A and Z-axis 97B directions. As illustrated, each flexure assembly 147A, 147B can comprise two flexible plates 153, although one or any number of plates could be used. Flexure assembly 147A is joined to sensor body 42 by mounting block 155 and to, for example, frame 12 by mounting block 147. Similarly, flexure assembly 147B is joined to clevis halves 46C, 48C with clevis tie block 159 and to, for example, frame 14 by mounting block 161. If desired, the flexure assemblies 147A and 147B can be used with all the embodiments described herein. In a further embodiment, the flexure assemblies 147A and 147B can further include cross flexures 169 (mounted to blocks 147,155,159 and 161 orthogonal to plates 153), which allow the flexible plates 153 to be thinner and thus more flexible.

A fastener such as the fastener comprising threaded rod 50 and other components described above joins the clevis halves 46C and 48C to the sensor body 42. It should be noted that although center portions of the clevis halves 46C and 48C will engage or contact the center portion of the sensor body 42, gaps are otherwise provided between each of the clevis halves 46C and 48C and the sensor body 42 so as to allow the sensor body 42 to move relative to the clevis halves 46C and 48C. In one embodiment as illustrated, the clevis halves 46C, 48C and tie block 159 are separate components that are fastened together in order that the clevis halves 46C, 48C do not develop a spring force when joined to sensor body 42. In particular, sensor body 42 is first joined to the clevis halves 46C, 48C with the fastener, and then the clevis halves are joined together with tie block 159.

If desired any of the embodiments herein described can include a torque sensor to measure torque about an axis extending through the coupling joining the sensor body to the clevis or clevises. The sensed torque value can be used for compensation if needed for reducing sensor crosstalk or compensating for beam stiffness or rotational stiffness of the transducers.

Figure 12:
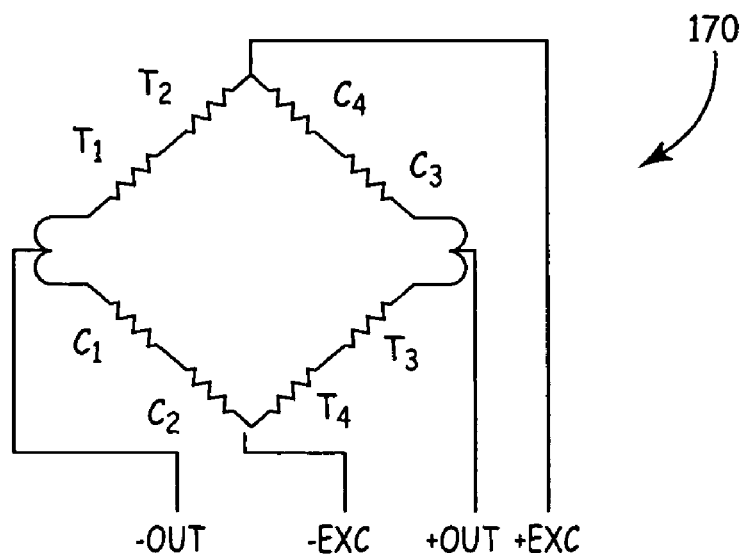
FIG. 12 is an exemplary torque sensing circuit.

Referring by way of example to the embodiment of FIGS. 9 and 10, the torque sensor can comprise sensors adapted to measure strain in flexures of the sensor body 42. For instance, sensors can comprise strain gauges 170 connected in a Wheatstone bridge as illustrated in FIG. 12. However, it should be understood any form of known electrical, mechanical and/or optically based sensors can be used.

Figure 11:
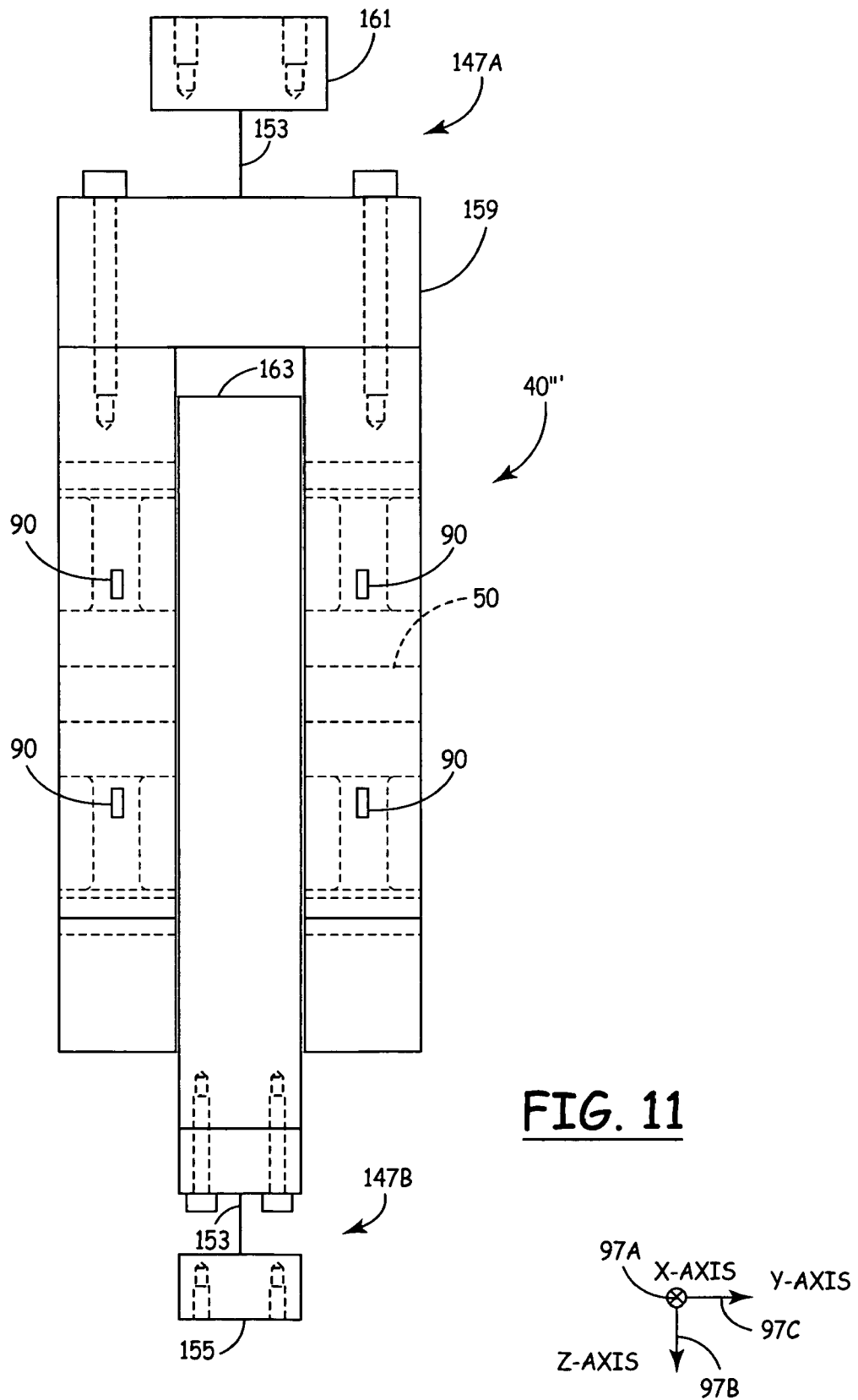
FIG. 11 is a side view of yet another transducer constructed in accordance with the present disclosure.

FIG. 11 shows an alternative embodiment of the transducer, i.e., transducer 40''' and corresponding body. Like parts are indicated with like reference numerals. In this embodiment, two sensor members 42 from FIGS. 9-10 become the clevis halves. In this example and unlike the previous examples, the inner member 163 is not instrumented and also rigid. Like the embodiment of FIG. 8, the sensor member structures 42 are instrumented with sensors and function as clevis halves, while flexure assemblies 147A and 147B provide lateral compliance as described in the previous embodiment, but do not include the cross flexures 169, which can be included if desired. Suitable sensors such as strain gauges 90 are still connected to the members 42.

Figure 14:
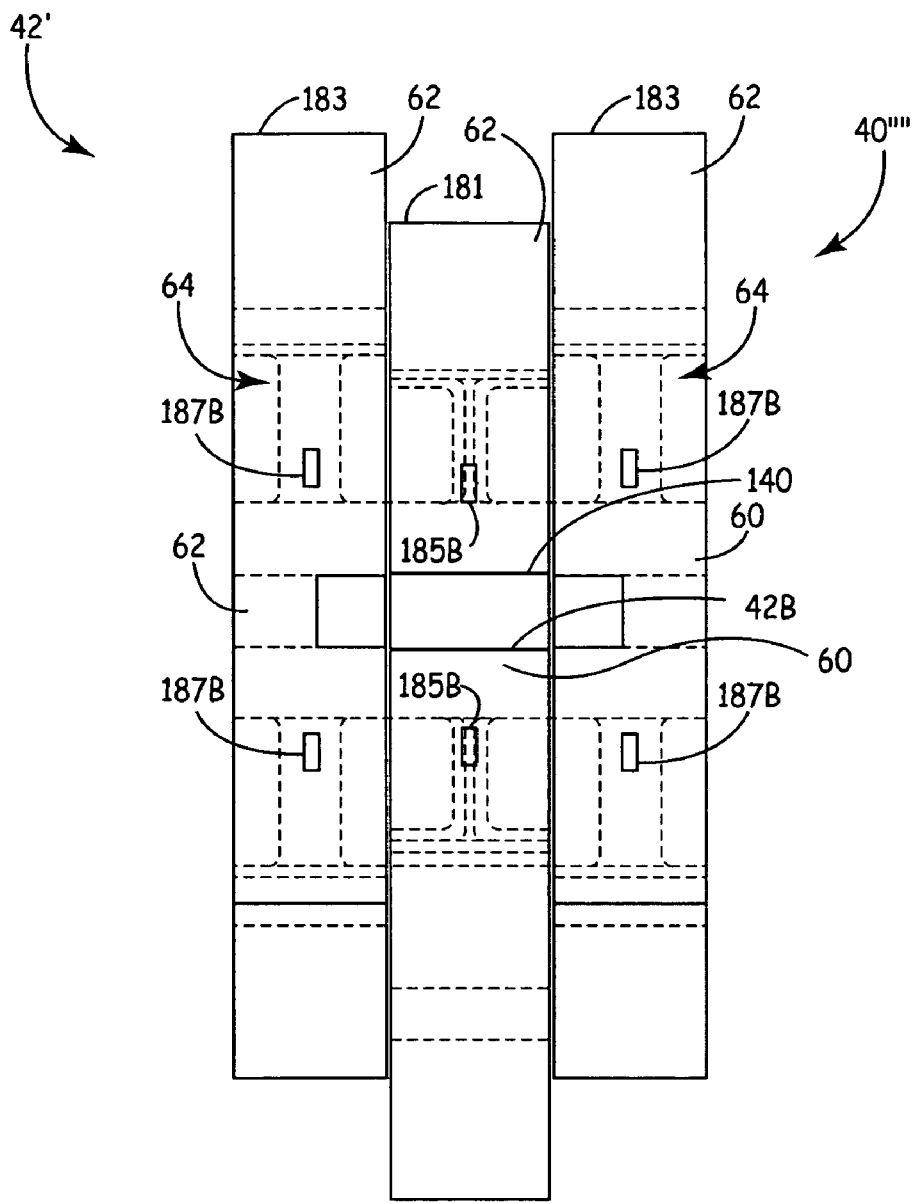
FIG. 14 is a side view of another transducer constructed in accordance with the present disclosure.

FIG. 14 shows yet another embodiment of the transducer, i.e., transducer 40'''' and corresponding body. Like parts are indicated with like reference numerals. In this embodiment, the transducer 40'''' includes a sensor assembly 42' where both the inner member 181 and one or both of the outer members 182 (clevis or devises in the previous embodiments) include sensors (electrical, mechanical or optical) for deflecting elements for sensing strain therein or displacement thereof. More particularly, the load path through the flexure structures 64 of the inner member 181 are connected in series with the corresponding flexure structures 64 of the outer member(s) 183 for loads along both the X-axis 97A and the Z-axis 97B. However, in order to extend the range of the transducer 40'''', the flexure structures of one of inner member 181 or outer member(s) 183 are designed to be responsive to a first range of loads, while the other has flexure structures designed to be responsive to a second range of loads, at least a portion of which is greater than that of the first range of loads.

Each of the inner member 181 and outer member(s) 183 has a hub 60 joined to outer perimeter body 64 with flexure structures 64. Loads are transferred between the inner member 181 and the outer members(s) 183 through the hubs 60, which are connected together. Stated another way, the transducer body 42' (less the sensing devices) of the transducer 40'''' includes at least two sensor bodies 181,183, where each sensor body 181,183 has a hub 60 joined to a perimeter body 62 surrounding the hub 60 with flexure structures 64. The hubs 60 are joined together and the flexure structures 64 are configured to respond to loads transferred between the sensor bodies 181,183 along two orthogonal sensed axes, where the flexure structures 64 of one of the sensor bodies 181,183 has an operable range greater than the flexure structures 64 of the second sensor body 181,183. In a further embodiment, as described below, the transducer body includes an overtravel mechanism to limit deflection of the flexure structures 64 of one of the sensor bodies 181,183 and transfer load to the other sensor body 181,183.

In the embodiment illustrated, by way of example only, the flexure structures 64 of the inner member 181 are constructed to respond in a known manner to the first range of loads, while the flexure structures of the outer member(s) 183 are stiffer and constructed to respond in a known manner to the second range of loads. In the exemplary embodiment of FIG. 15, the inner member 181 includes strain sensors 185 connected in two conventional Wheatstone bridges, where sensors 185A are mounted and connected so as to sense loads along axis 97B, while sensors 185B are mounted and connected so as to sense loads along axis 97A. Similarly, in the embodiment illustrated, one or both of the outer members 183 can include strain sensors 187 mounted to the flexure structures 64 thereof like strain sensors 185 are mounted to flexure structures 64 of inner member 181. In FIG. 14, sensors 187B are similar to sensors 185B, while other sensors (not shown) are similar to sensors 185A. Sensors 187 of the outer member(s) 183 provide signal(s) indicative of the second range of loads. Processor 180 can receive all the signals from the sensing devices for the inner member 181 and the outer member(s) 183 and can include circuitry and/or logic to know which signal(s) to use for any load measured by the transducer 40"".

In view that the inner member 181 has flexure structures more responsive (higher sensitivity) to loads of the first range, overtravel protection is provided so as to limit displacement of the flexure structures 64 of the inner member 181. As appreciated by those skilled in the art, overtravel protection can take many forms, but typically involves contact of engaging surfaces so as to limit displacement of the flexure structures. Referring to FIG. 14, one form of overtravel can be provided with pin 140.

Referring to FIG. 15 and as described above in the previous embodiments, flexure straps 86 and 88 are connected to each of the flexure structures 64 so as to provide compliance. In the embodiment illustrated, overtravel protection is provided by stops 191 that contact opposed surfaces 193 when loads exceeding the first range of loads are being applied. In one embodiment, one of the engaging surfaces of the stops 191 or its corresponding surface 193 is curved (e.g. part spherical, cylindrical, etc.) so as to allow pivoting motion during contact, if needed. It should also be noted the sensitivity of the flexure structures 64 responsive to loads along the X-axis 97A and Z-axis 97C of the inner member 181 and/or outer member(s) 183 may be the same or may be different. Compliance along the Y-axis 97B can be provided by flexures 153 as described above with respect to the embodiment of FIG. 11.

In each of the embodiments described above the sensor body 42 is securely coupled to the corresponding supporting clevis or devises at the center portions thereof. However, in a further embodiment, a pivot connection can be provided between the sensor body 42 and clevis or devises. The pivot connection eliminates rotational stiffness of the transducer.

Figure 13:
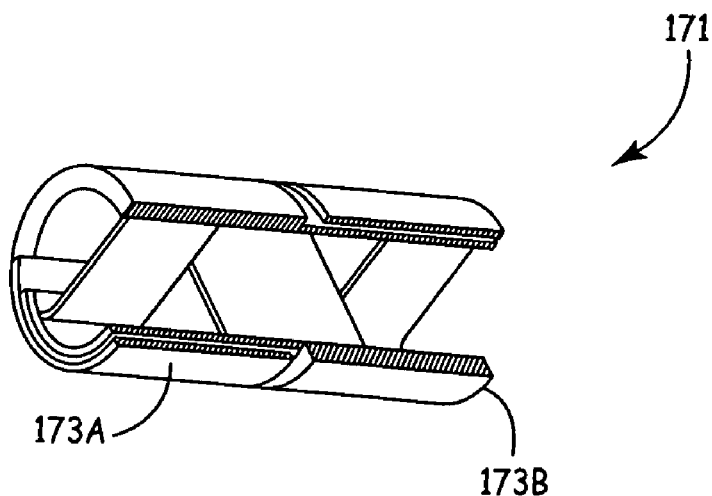
FIG. 13 is a perspective view of a flexure pivot bearing.

In one embodiment as illustrated in FIG. 13, a flexure pivot bearing 171, can be used in place of fastener 50 to allow the sensor body 42 to rotate about an axis extending through the sensor body 42 and the supporting clevis or clevises, yet the sensor body 42 senses forces in two orthogonal directions as described above. Flexure pivot bearings are well known and for instance sold by Riverhawk Company of New Hartford, N.Y., USA. Flexure pivot bearing 171 is suitable for use with a sensor body joined to portion 173A, while a single support clevis is joined to portion 173B. In embodiments where two support clevises (sensor bodies) are present, a doubled ended flexure pivot bearing is used where two portions 173B are provided on each side of portion 173A and secured to the clevises (sensor bodies). As appreciated by those skills in the art, other forms of pivot connections can be used such as but not limited to air bearings, needle bearings and hydrostatic bearings.

The platform balance 10 is particularly well suited for measuring force and/or moments upon a large specimen such as a vehicle in an environment such as a wind tunnel. In this or similar applications, the platform balance 10 can include flexures 170 isolating the frame support 12 and 14 from the test specimen and a ground support mechanism. In the embodiment illustrated, four flexures 170 are provided between each of the transducer assemblies 40, being coupled to the plates 120. Similarly, four flexures 172 are coupled to the mounting plates 122. The flexure 170, 172 thereby isolate the frame supports 12 and 14. The flexures 170, 172 are generally aligned with the sensor bodies 42 of each corresponding transducer assembly 40.

A counter balance system or assembly is generally provided to support the nominal static mass of the test specimen, other components of the operating environment such as roadways, simulators and components of the platform balance itself. The counter balance system can take any one of numerous forms such as airbags, hydraulic or pneumatic devices, or cables with pulleys and counter weights. An important characteristic of the counter balance system is that it is very compliant so as not to interfere with the sensitivity or measurement of the forces by the transducers assemblies 40 in order to measure all of the forces and moments upon the test specimen. In the embodiment illustrated, the counter balance system is schematically illustrated by actuators 190.

The platform balance 10 is particularly well suited for use in measuring forces upon a vehicle or other large test specimen in a wind tunnel. In such an application, rolling roadway belts 182 are supported by an intermediate frame 184 coupled to the flexure members 170. The rolling roadway belts 182 support the vehicle tires. In some embodiments, a single roadway belt is used for all tires of the vehicle. The platform balance 10 and rolling roadway belt assemblies 182 are positioned in a pit and mounted to a turntable mechanism 186 so as to allow the test specimen, for example a vehicle, to be selectively turned with respect to the wind of the wind tunnel.

Aspects of the present invention have now been described with reference to several embodiments. Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A transducer body, comprising:
a support comprising a pair of clevis halves; and
a sensor body coupled to each of the clevis halves, wherein the sensor body is disposed between the clevis halves and adapted to deflect along two orthogonal sensed axes and be rigid along a third axis that is mutually orthogonal to the sensed axes, wherein the sensor body includes a generally rigid peripheral member disposed about a spaced-apart central hub, the central hub being joined to each of the clevis halves, wherein at least three flexure structures couple the peripheral member to the central hub, and wherein the flexure structures are spaced-apart from each other at generally equal angle intervals about the central hub; and wherein the flexure structures are arranged to be compliant and deflect along the two orthogonal axes and be rigid along the third axis.

2. The transducer body of claim 1 wherein the sensor body includes four flexure structures spaced-apart from each other at generally equal angle intervals about the central hub.

3. The transducer body of claim 1 in combination with a first frame support, a second frame support and a second transducer body, wherein the first frame support is coupled to the sensor body and to a first portion of the second transducer body at a location remote from the sensor body, and wherein the second frame support is coupled to the support and to a second portion of the second transducer body at a location remote from the support.

4. The transducer body of claim 3 in combination with a third transducer body and a fourth transducer body, wherein a first portion of each of the third and fourth transducer bodies are coupled to the first frame support and a second portion of each of the third and fourth transducer bodies are coupled to the second frame support, wherein the transducer body and the second transducer body are spaced apart from each other along a first line, and the third and fourth transducer bodies are spaced apart from each other along a second line, the first line and the second line being orthogonal to each other.

5. The transducer body of claim 1 wherein each clevis halve includes a compliant member that is compliant in the third axis and rigid in the two orthogonal axes.

6. The transducer body of claim 1 wherein the clevis halves are rigid along the two orthogonal sensed axes and the third axis and wherein the clevis halves are joined together remote from the central hub.

7. The transducer body of claim 6 and further comprising a first flexure assembly coupled to the sensor body and a second flexure assembly coupled to the clevis halves, the first and second flexure assemblies each being compliant along the third axis and rigid along axes mutually orthogonal to the third axis.

8. The transducer body of claim 7 wherein the first flexure assembly comprises at least one flexible plate.

9. The transducer body of claim 8 wherein the second flexure assembly comprises at least one flexible plate.

10. The transducer body of claim 9 wherein the first flexure assembly comprises a cross flexure.

11. The transducer body of claim 10 wherein the second flexure assembly comprises a cross flexure.

12. The transducer body of claim 7 wherein the first flexure assembly comprises a plurality of orthogonal flexures wherein one of the flexures is oriented along the third axis.

13. The transducer body of claim 12 wherein the second flexure assembly comprises a plurality of orthogonal flexures wherein one of the flexures is oriented along the third axis.

14. The transducer body of claim 1 and further comprising a pivot connection joining the sensor body to the clevis halves allowing pivoting motion of the sensor body relative to the clevis halves about an axis extending through the sensor body and the clevis halves.

15. The transducer body of claim 14 wherein the pivot connection comprises a flexure.

16. The transducer body of claim 14 wherein the pivot connection is a plurality of orthogonally arranged flexures.

17. The transducer body of claim 1 wherein each flexure structure of the sensor body comprises a first flexure radially oriented from the central hub to the peripheral member and second and third flexures joined to an end of the first flexure and extending away from each other.

18. The transducer body of claim 1 and further comprising a first flexure assembly coupled to the support and a second flexure assembly coupled to the sensor body, the first and second flexure assemblies each being compliant along the third axis and rigid along the sensed axes.

19. A transducer body, comprising:
a support comprising a pair of clevis halves; and
a first body coupled to each of the clevis halves, wherein the first body is disposed between the clevis halves and adapted to deflect along two orthogonal axes and be rigid along a third axis that is mutually orthogonal to the two orthogonal axes; wherein each of the clevis halves are rigid along the two orthogonal axes and compliant along the third axis.

20. The transducer body of claim 19 wherein the first body includes a generally rigid peripheral member disposed about a spaced-apart central hub, wherein at least three flexure structures couple the peripheral member to the central hub, and wherein the flexure structures are spaced-apart from each other at generally equal angle intervals about the central hub; and wherein the flexure structures are arranged to be compliant and deflect along the two orthogonal axes and be rigid along the third axis.

21. The transducer body of claim 20 wherein the first body includes four flexure structures.

22. The transducer body of claim 20 wherein the central hub is coupled to each of the clevis halves.

23. The transducer body of claim 20 and further comprising a plurality of sensors configured to measure flexure of the flexure structures.

24. The transducer body of claim 20 wherein each clevis halve comprises a central hub joined to a perimeter body surrounding the central hub with flexure structures, wherein the hub of the first body is joined to the hubs of each clevis halve and wherein the flexure structures of each clevis halve are arranged to respond to loads transferred between the first body along two orthogonal axes, and wherein the flexure structures of the first body has an operable range different than the flexure structures of the clevis halves.

25. The transducer body of claim 24 and further comprising an overtravel mechanism to limit deflection of the flexure structures of one of the first body or the clevis halves and transfer load to the other.

26. The transducer body of claim 19 wherein each of the clevis halves comprise a rigid outer body and a rigid central hub, wherein a plurality of flexures couple the peripheral member to the central hub.

27. The transducer body of claim 26 and a pivot connection pivotally joining the central hubs of the clevis halves with the central hub of the first body.

28. The transducer body of claim 26 and further comprising a first flexure assembly coupled to the first body and a second flexure assembly coupled to the clevis halves.

29. A transducer body, comprising:
a support comprising a pair of clevis halves; and
a body coupled to each of the clevis halves, wherein the body is disposed between the clevis halves and adapted to deflect along two orthogonal axes and be rigid along a third axis that is mutually orthogonal to the two orthogonal axes;
a pivot connection joining the body to the clevis halves allowing pivoting motion of the body relative to the clevis halves about an axis extending through the body and the clevis halves, wherein the pivot connection is a plurality of orthogonally arranged flexures.

30. A transducer body, comprising:

a first body;

a second body having a rigid peripheral member disposed about a rigid central hub, wherein at least three flexure structures couple the peripheral member to the central hub, and wherein the flexure structures are spaced-apart from each other at generally equal angle intervals about the central hub;

a third body having a rigid peripheral member disposed about a rigid central hub, wherein at least three flexure structures couple the peripheral member to the central hub, wherein the flexure structures are spaced-apart from each other at generally equal angle intervals about the central hub;

wherein the central hubs of the second and third bodies are joined to the first body on opposite sides of the first body and wherein the flexure structures of the second and third bodies are arranged to be compliant and deflect along two orthogonal axes and be rigid along a third axis;

a first flexure joined to the first body;

a second flexure joined to the second and third bodies; and wherein the first flexure and second flexure are each arranged to be rigid along the two orthogonal axes and compliant along the third axis.

31. The transducer body of claim 30 and a pivot connection pivotally joining the central hub of the first body with the central hubs of the second and third bodies.

32. A transducer body, comprising:

a support comprising a pair of clevis halves;

a sensor body coupled to each of the clevis halves, wherein the sensor body is disposed between the clevis halves and adapted to deflect along two orthogonal sensed axes and be rigid along a third axis that is mutually orthogonal to the sensed axes;

a first flexure joined to the sensor body;

a second flexure joined to the support; and wherein the first flexure and second flexure are each arranged to be rigid along the two orthogonal sensed axes and compliant along the third axis.

33. The transducer body of claim 32 wherein the first flexure comprises at least one flexible plate.

34. The transducer body of claim 33 wherein the second flexure comprises at least one flexible plate.

35. The transducer body of claim 34 wherein the first flexure and the second flexure each comprise a cross flexure.

36. The transducer body of claim 32 in combination with a first frame support, a second frame support and a second transducer body, wherein the first frame support is coupled to the first flexure and to a first portion of the second transducer body at a location remote from the first flexure, and wherein the second frame support is coupled to the second flexure and to a second portion of the second transducer body at a location remote from the second flexure.

37. The transducer body of claim 36 in combination with a third transducer body and a fourth transducer body, wherein a first portion of each of the third and fourth transducer bodies are coupled to the first frame support and a second portion of each of the third and fourth transducer bodies are coupled to the second frame support, wherein the transducer body and the second transducer body are spaced apart from each other along a first line, and the third and fourth transducer bodies are spaced apart from each other along a second line, the first line and the second line being orthogonal to each other.

* * * * *